Dec. 6, 1927.                                              1,651,744
H. E. VAN DERHOEF
PROCESS OF HANDLING STRIPS OF SHEET MATERIAL
Filed June 26, 1923
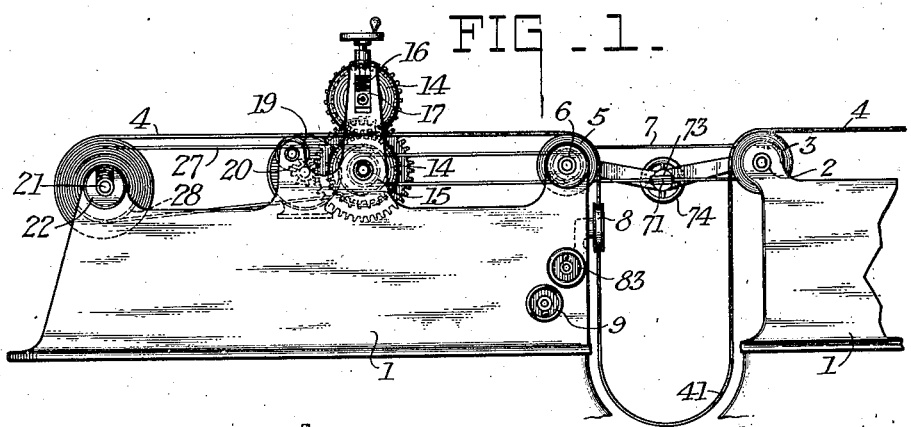
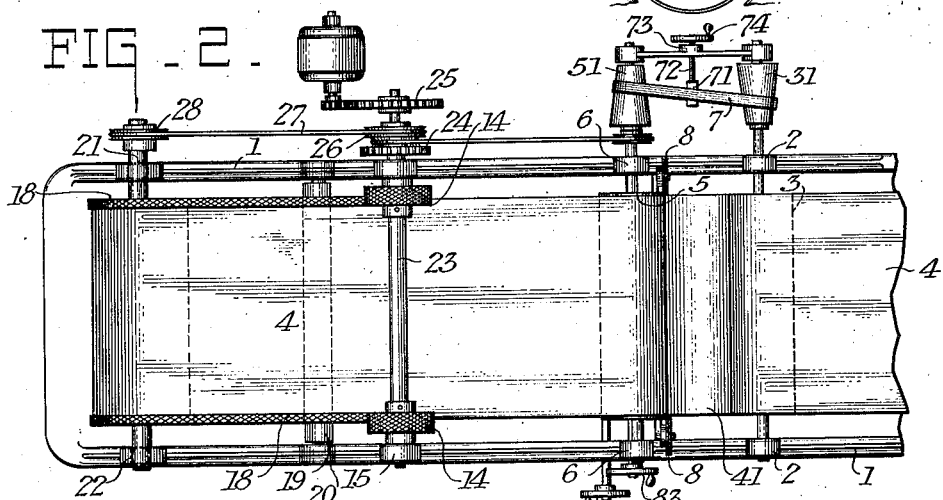
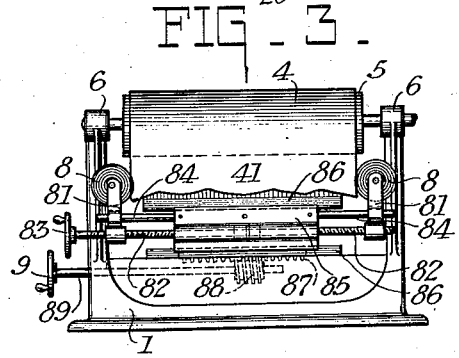
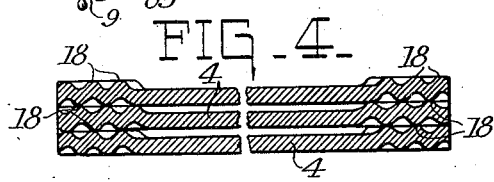
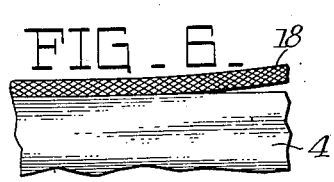
INVENTOR.
Henry E. Van Derhoef,
BY R. L. Stinchfield
ATTORNEY Patented Dec. 6, 1927.

1,651,744

UNITED STATES PATENT OFFICE.

HENRY E. VAN DERHOEF, OF ROCHESTER, NEW YORK, ASSIGNOR TO EASTMAN KODAK COMPANY, OF ROCHESTER, NEW YORK, A CORPORATION OF NEW YORK.

PROCESS OF HANDLING STRIPS OF SHEET MATERIAL.

Application filed June 26, 1923. Serial No. 647,945.

This invention relates to a process of handling strips of sheet material. In its preferred embodiment it relates to handling such strips, the surfaces of which are in such condition that they form defects by intercontact, particularly when coiled up with the surfaces touching each other. One object of the invention is to provide a process for handling such strips of material without injury to the surfaces, intercontacting being substantially prevented. Another object of the invention is to provide a method by means of which strips of sheet material may be rapidly, economically and accurately provided with thickened edges and then coiled up, with the convolutions properly spaced by means of said thickened edges. Still another object is to provide a process by means of which the strips of sheet material may be coiled up without the convolutions touching, being spaced apart by thickened edges, the strips being uncoiled, before further treatment takes place, and the thickened edges severed and removed. Other objects will hereinafter appear.

In the accompanying drawing:

Fig. 1 is a side elevation of one of the types of apparatus in which certain steps of my process may be carried out, parts of the apparatus being exaggerated in scale for the sake of clearness;

Fig. 2 is a plan view of the apparatus shown in Fig. 1;

Fig. 3 is an end elevation of the main part of the apparatus shown in Fig. 1;

Fig. 4 is a fragmentary sectional view, on an exaggerated scale, through several convolutions of coiled material at one stage of my process, showing the spacing function of one type of the thickened edges;

Fig. 5 is a similar sectional view illustrating the spacing function of still a different type of thickened and deformed edge;

Fig. 6 is a fragmentary plan view showing diagrammatically the severing of a thickened edge from the strip.

At certain stages of their manufacture many kinds of sheet material have to be coiled up for transportation to the places where they are given further threatment. Sometimes they have to be stored for considerable periods before the subsequent treatment takes place. Oftentimes the surfaces of these strips of material are in such a condition that defects develop in them when they are brought into contact, especially prolonged contact or contact under great pressure. When the surfaces are in such a state, it is desirable to maintain the convolutions of the coiled strips in substantially spaced relation. To do this by means of a special apparatus requires an expensive investment and the apparatus takes up considerable space and is bulky and heavy in case of transportation.

I have discovered that the defects due to intercontact may be avoided by forming the spacing means for the convolutions of the coiled strips out of the materials of the strips themselves, thus making unnecessary the use of expensive, heavy and bulky coiling devices. I have found that it is merely necessary to deform the edges of such strips so as to raise portions of them above the surfaces thereof and then coil the strips with the raised portions between the convolutions, thereby holding the surfaces of the undeformed parts of the convolutions substantially out of contact and preventing deleterious results which would follow if the surfaces touched each other. When the time comes for the strips to be further treated in subsequent manufacturing operations, the coils can be unwound and the thickened edges cut off with the surfaces of the strips in the desired unharmed condition.

I likewise have found an economical and accurate process of thickening the edges of strips of sheet material and coiling up the latter, even where the surfaces are not sensitive to intercontact, such strips with thickened edges entering into later manufacturing operations where said thickened edges have further functions.

My invention is particularly useful in connection with strips of paper of suitable stiffness and strips of flexible cellulosic sheets, such as the nitrocellulose films which are used as supports for sensitive photographic materials. Paper strips which have coatings that have not yet set or dried and cellulosic films, such as nitrocellulose sheets in which the surfaces are rather soft, are handled particularly well by my method. It is a surprising fact that even a slight thickening of the edges is adequate to hold apart the convolutions of strips which are even several feet wide, sufficiently to avoid the production of defects.

By way of illustration, I shall describe the application of my process to strips of nitrocellulose films, but my invention is not limited to them, except as indicated in the appended claims. My method may be carried out by many different types of apparatus or even by hand, but in commercial practice properly arranged mechanism is, of course, preferred. Referring to Figs. 1, 2 and 3 for an illustration of one suitable apparatus, on a base or support 1 are located bearings 2 for roll 3 over which the film 4 passes into loop 41. From loop 41 the film moves over roll 5 mounted in bearings 6. Rolls 3 and 5 are driven one through the other by a variable speed mechanism, such as cone pulleys 31 and 51 connected by belt 7 which is adjustable over the pulleys to alter their relative speeds. The adjustment of the belt may be effected by a block 71, through a hole in which the belt passes, said block being moved by threaded shaft 72, rotatably mounted in the block and passing through the fixed threaded bearing 73, said shaft being turned by handwheel 74. By adjusting the relative speeds of rolls 3 and 5 through the mechanism just described the size of loop 41 can be kept constant or within allowable limits, as is obvious.

In order to direct the film accurately to the edge-knurling mechanism, hereinafter described, I provide adjustable guides, such as rolls 8, acting on the edges of loop 41. Rolls 8 are rotatably mounted on slides 81 which are moved over guide rods 84 by right and left threaded shaft 82 which fits threaded bearings in slides 81. When shaft 82 is turned by handwheel 83 the right and left threads move the slides and rolls 8 toward and from each other to cooperate with film strips of different widths. Guide rods 84 are mounted on carriage 85 and shaft 82 turns in a bearing in said carriage. The latter slides transversely of the path of film 4 on tracks 86 and is adjusted by teeth 87 thereon engaging worm 88 on shaft 89 turned by handwheel 9. The bearings of shafts 82 and 89 prevent axial movement thereof. By manipulating handwheels 9 and 83, the operator can guide strips of different width accurately over roll 5 so that they will properly enter the knurling rolls. This is facilitated by having the rolls 8 engage the edges of the free loop 41.

The accurately guided strip passes between any suitable knurling or corrugating rolls 14 mounted one above the other in bearings 15, the upper rolls being forced against the lower rolls by means of springs 16 which press down the bearing blocks 17 of the upper rolls in vertical slots in bearings 15. Rolls 14 deform the edges of the strips 4 so as to produce raised portions thereon. As diagrammatically indicated in Figs. 4 and 5 in the preferred form of my invention, I knurl a large number of very small projections 18 in the edges of the film. These projections may, as illustrated in Fig. 4, thicken the edges by rising above only one face of the strip, but in the preferred form of my invention they extend above both faces of the strip 4, as shown in Fig. 5. In the case of cellulosic film strips, which are several feet wide, I have found it sufficient to knurl the edges of the strip along edge bands which are only a fraction of an inch wide and which double the ordinary thickness of the film,—that is, the projections extend above the upper end below the lower surfaces of the strip to a distance approximately equal to one-half the normal thickness of the strip, as diagrammatically shown in Fig. 5. These dimensions are only given by way of illustration and are susceptible of wide variation in the case of film base and, of course, will vary considerably when paper and other sheet materials are treated.

If desired, an idler roll 19 mounted on extensions 20 of bearings 15 may be employed to direct the strip 4 to the winding shaft 21 mounted in bearings 22, on which the strip 4 with the thickened or raised edges is coiled up. Winding shaft 21 is, of course, removable from the bearings 22 with the coiled material thereon, so that a fresh winding shaft can be inserted to receive another strip. For this purpose the bearings 21 may open vertically upward.

The knurling rolls 14 are mounted on shafts 23, and one or both of them are driven by gears 24 mounted on shafts 23 connected with any suitable source of power 25,—say a geared down electric motor. On the lower shaft 23 is located a pulley 26 connected by a belt 27 with pulley 28 on the wind-up shaft 21. This belt slips sufficiently to compensate for the increasing winding diameter as the strip 4 is coiled up larger and larger on the winding shaft 21.

When the completed coiled sheets are removed from the machine they may be stored or transported without the surfaces of the convolutions being brought into contact. If the strips are to be used in further manufacturing processes where thickened edges are undesirable, the strips are uncoiled and the thickened edges severed and removed, as indicated diagrammatically in Fig. 6. It will be noted that the strip 4 passes along a definite path and during its movement has its edges progressively raised or thickened and at the end of the path is coiled up with the convolutions spaced apart by said thickened edges. Attention is also called to the fact that the strip is preferably guided during such movement to provide for the accurate carrying out of the steps of the process.

When nitrocellulose strips in the form of transparent flexible film, such as is customarily used for photographic film supports, is treated by my method as above described the formation of pimples and ridges is avoided. These troublesome defects appear when the surfaces of the strip in a somewhat soft or susceptible condition are brought into contact and stick or otherwise interact to form slight projections or small translucent patches, especially during storage over considerable periods of time.

The relatively brief contacts of the surfaces of strip 4 with rolls 3, 5 and 19 do not cause defects, the faces of the rolls being of very smooth material, say polished metal. Where one or both of the surfaces of strip 4 are in such condition that it is inadvisable for them to even touch smooth rolls, the latter can be omitted, the strip passing directly through the edge knurling or distorting rolls from the source of supply to the winding shafts 21.

Having thus described my invention, what I claim as new and desire to secure by Letters Patent is:

1. The process of handling strips of sheet material the surfaces of which form defects upon intercontact, which comprises the steps of thickening the edges of said strips, coiling them for storage with the thickened edges of the convolutions spacing apart the surfaces of the unthickened portions thereof, and thereafter uncoiling said strips and severing said thickened edges therefrom.

2. The process of handling a strip of flexible transparent nitrocellulose film during the time when its surfaces form defects upon intercontact, which comprises, moving it along a path and accurately guiding it, deforming its edges to thicken them while moving and guided along said path, coiling the strip with said thickened edges holding apart the surfaces of the unthickened portions of the convolutions, and thereafter uncoiling said strips and severing said thickened edges therefrom.

3. The process of handling a flexible strip of cellulosic film base which comprises knurling the edges thereof until they are thicker than the rest of the strip, coiling said strip with the knurled edges of the convolutions in registry to space the unthickened parts of said convolutions with their surfaces out of contact, uncoiling said strip and thereafter cutting said knurled edges therefrom.

4. The process of handling a strip of flexible cellulosic film a plurality of feet wide while in a condition in which its surfaces form defects on intercontact, which comprises moving it along a path in part of which it is suspended in a hanging loop, guiding its edges by engaging part of them while in said loop, deforming said edges while so guided to raise portions of said edges above a surface of said strip, the height of the raised portions above said surface being less than the normal thickness of said film, and coiling said strip at the end of said path with said raised portions between the convolutions, said convolutions being substantially cylindrical to arch them against sagging, and said arched convolutions being held out of injurious contact by said raised portions, one surface of said undeformed parts remaining untouched throughout the entire process and the other surface being touched only by smooth supporting faces moved at the same speed as the contacting film.

Signed at Rochester, New York this 19th day of June, 1923.

HENRY E. VAN DERHOEF.